United States Patent [19]
Kimura

[11] Patent Number: 4,574,056
[45] Date of Patent: Mar. 4, 1986

[54] DIE-BONDING ELECTROCONDUCTIVE PASTE

[75] Inventor: Shoichi Kimura, Tsukui, Japan

[73] Assignee: Kidd, Inc., Kanagawa, Japan

[21] Appl. No.: 678,246

[22] Filed: Dec. 5, 1984

[30] Foreign Application Priority Data

Dec. 16, 1983 [JP] Japan .................. 58-236023

[51] Int. Cl.$^4$ ............................................. H01B 1/16
[52] U.S. Cl. .................................. 252/514; 252/500; 252/503; 252/506; 252/511; 252/512; 252/515; 252/518; 428/418; 428/688; 428/699; 428/704; 428/901
[58] Field of Search ............... 252/500, 503, 506, 511, 252/512, 514, 515, 518; 428/418, 688, 699, 704, 901

[56] References Cited

U.S. PATENT DOCUMENTS

| | | | |
|---|---|---|---|
| 3,925,698 | 12/1975 | Stahl | 252/500 |
| 4,293,451 | 10/1981 | Ross | 252/512 |
| 4,317,856 | 3/1982 | Huthwelker et al. | 428/901 |

*Primary Examiner*—Paul Lieberman
*Assistant Examiner*—Robert A. Wax
*Attorney, Agent, or Firm*—Omri M. Behr

[57] ABSTRACT

A die-bonding electroconductive paste containing at least one element having the same valence as the valence of a semiconductor element to be die-bonded or a compound of said element and a reducing substance and permitting ohmic contact to be effected at a temperature of not less than 100° C.

15 Claims, No Drawings

DIE-BONDING ELECTROCONDUCTIVE PASTE

BACKGROUND OF THE INVENTION

1. Field of the Invention

This invention relates to a die-bonding electroconductive paste. More particularly, this invention relates to a die-bonding electroconductive paste which permits ohmic contact with a semiconductor element without requiring any undercoat electrode treatment.

2. Description of Prior Art

The die-bonding electroconductive pastes heretofore known to the art include those produced by blending fine electroconductive powders of such metals as gold, silver, copper, nickel, rhodium, palladium and silverpalladium and such heat-resistant binders as epoxy resin, polyimide, glass glaze and cement with and without a solvent. These die-bonding electroconductive pastes are used for die-bonding semiconductor elements on substrates. When the die-bonding with such an electroconductive paste is effected in the case of a semiconductor element capable of allowing flow of feeble current, the part so die-bonded becomes non-ohmic and manifests its function satisfactorily only with difficulty. For the die-bonded semiconductor element to produce ohmic contact, therefore, the semiconductor element is required to have its rear surface subjected in advance to an undercoat electrode treatment by vacuum deposition of gold, for example. Further, the contact so formed elaborately is unstable as compared with the contact obtainable by the Au-Si eutectic method, for example.

An object of this invention, therefore, is to provide a novel die-bonding electroconductive paste.

Another object of this invention is to provide a die-bonding electroconductive paste capable of permitting ohmic contact with a semiconductor element without requiring any undercoat electrode treatment.

SUMMARY OF THE INVENTION

These objects are attained by a die-bonding electroconductive paste containing at least one element having the same valence as the valence of a semiconductor element to be die-bonded or a compound of the element and a reducing substance and permitting ohmic contact to be obtained at a temperature of not less than 100° C.

DESCRIPTION OF PREFERRED EMBODIMENT

The electroconductive paste of the present invention is produced by blending the conventional electroconductive paste with at least one element having the same valence as the valence of a semiconductor element to be die-bonded and, therefore, the ability to match the chemical affinity with the semiconductor or a compound of the element and a reducing substance.

Examples of the element to be added for matching of chemical affinity are such tetravalent elements as silicon, germanium, carbon, titanium, zirconium, tin, hafnium and lead, preferably silicon, germanium, carbon, titanium and zirconium in the case of the elements of Group IV such as silicon and germanium; such trivalent elements as boron, aluminum, scandium, gallium, yttrium, indium, lanthanides and actinides, preferably gallium, aluminum, indium and yttrium and such pentavalent elements as nitrogen, phosphorus, vanadium, arsenic, niobium, antimony, tantalum and bismuth, preferably arsenic, phosphorus, vanadium, tantalum and niobium in the case of the elements of Group III-V such as potassium-phosphorus, gallium-arsenic, gallium-arsenic-phosphorus, gallium-aluminum-arsenic and gallium-aluminum-arsenic-phosphorus, such divalent elements beryllium, magnesium, calcium, strontium, barium, zinc, cadmium and mercury, preferably zinc and cadmium and such hexavalent elements as chromium, molybdenum, tungsten, oxygen, sulfur, selenium and tellurium, preferably selenium and tellurium in the case of the elements of Groups II-VI such as zinc-sulfur, zinc-selenium, zinc-tellurium, mercury-cadmium-tellurium and cadmium-tellurium. One member or a mixture of two or more members selected from the class consisting of elements enumerated above can be used in the form of a simple element or a compound. When the element to be die bonded is a simple element such as silicon or germanium at least one element is used for the matching of chemical affinity of that simple element. When the element is a composite system such as a combination of elements of Groups III-V or Groups II-VI, for example, at least one each of the chemical affinity matching elements corresponding to the valences of the component elements in the combination is used. The amount of the element to be used is 5 to 90% by weight, preferably 20 to 60% by weight, as simple element based on the total amount of the electroconductive paste of this invention. The elements is generally used in the form of finely divided simple substance 0.5 to 50 $\mu$m, preferably 1 to 10 $\mu$m, in average particle diameter. When the simple element is gaseous or unstable, it is used in the form of a stable compound of that element, Examples of this compond are inorganic compounds such as sulfide, nitride, oxide, carbide and hydride, and organic compounds.

The reducing substance to be used in the electroconductive paste of this invention can be selected from a wide variety of substances. Concrete examples of the substance include metal hydrides such as $CuH_2$, $NiH_2$, $CoH_2$, $FeH_2$, $FeH_6$, $CrH$, $WH_3$, $TiH_4$, $SiH_4$, $GeH_4$, $ZrH_4$, $HfH_4$, $Na[BH_4]$ and $Li[BH_4]$, carbides such as $AL_2C_6$, $LaC_2$, $CeC_2$, $NdC_2$, $SmC_2$, $YC_2$, $ThC_2$, $VC_2$, $SiC$, $TiC$, $HfC$, $ZrC$, $Cr_3C_2$, $VC$, $NbC$, $TaC$, $Mo_2C$, $MoC$, $W_2C$, $WC$, $Cr_4C$, $Fe_3C$ and $B_4C$, higher fatty acids such as lauric acid, myristic acid, palmitic acid, stearic acid, oleic acid and behenic acid, organic metal compounds such as dimethyl zinc, diethyl zinc, triethyl aluminum, isopropyl aluminum, Grignard reagent, metal salts of naphthenic acid, metal salts of acetic acid, and metal salts of propionic acid, organic silicon compounds, and hydrazine. One member or a mixture of two or more members selected from thes reducing substances can be used. The amount of the reducing substance to be used is 0.5 to 50% by weight, preferably 1 to 10% by weight, based on the total amount of the electroconductive paste of this invention.

The chemical affinity matching element and the reducing substance described above are generally blended with any of the conventional die-bonding electroconductive pastes. These conventional pastes are produced by blending finely divided powders of such metals as gold, silver, copper, nickel, rhodium, palladium and silver-palladium and heat-resistant binders such as epoxy resin, polyimide, polyamideimide, glass glaze and cement with and without a solvent. The aforementioned finely divided powder is, for example, finely powdered gold or silver having an average particle diameter of 1 to 20 $\mu$m, preferably 1 to 5 $\mu$m. The amount of the electroconductive powder to be used is generally 0 to 80% by weight, preferably 25 to 60% by weight, based on the total amount of the electroconductive paste of this invention.

Typical examples of the epoxy resin are epichlorohydrin-bisphenol A type, novolak type, β-methylepichlohydrin type, alicyclic types (cyclic oxylan type, glycidyl ether type and glycidyl ester type), heteroalicyclic types (polyglycol ether type, glycol ether type and epoxidized aliphatic unsaturated compound type), epoxidized animal and vegetable oils, polycarboxylic ester type, aminoglycidyl type, chlorinated type, and resorcin type. Of these examples, preferable in epichlorohydrinbisphenol A type and novolak type. The epoxy resin is used in combination with a curing agent. Examples of the curing agent are amines such as diethylene triamine, benzyl dimethylamine, diaminodiphenylamine, diaminodiphenyl sulfone and polyamides, acid anhydrides such as phthalic anhydride, maleic anhydride, hexahydrophthalic anhydride, methyl nadic anhydride, pyromellitic anhydride and benzophenone tetracarboxylic anhydride, and phenol novolak. The aforementioned binder is generally used in an amount of 3 to 50% by weight, preferably 10 to 30% by weight, based the total amount of the electroconductive paste of the present invention.

For the component described above to be blended in the form of paste, there is used a solvent.

This solvent is only required to be capable of solving the aforementioned binder. Glycol ethers such as ethylene glycol monomethyl ether, ethylene glycol monoethyl ether, ethylene glycol monobutyl ether are available for epoxy resin and methyl pyrrolidone is available for polyimide, for example. This solvent is generally used in an amount of 0 to 30% by weight, preferably 3 to 20% by weight, based on the total amount of the electroconductive paste of the invention.

The electroconductive paste of this invention is obtained by putting the aforementioned components together and thoroughly kneading them. The ohmic contact of the electroconductive paste with a semiconductor element to be die-bonded can be obtained by applying the paste on the semiconductor element without subjecting the semiconductor element in advance to any undercoat electrode treatment and effecting die-bonding of the resultant superposed elements at a temperature of not less than 100° C., preferably in the range of 150° to 250° C. Examples of the semiconductor element on which the ohmic contact is obtained include VLSI, LSI, IC, transistor, diode, LED, phototransistor, photo cell, and semiconductor laser.

Now, the present invention will be described more fully below with reference to working examples.

EXAMPLE 1

| | |
|---|---|
| Finely powdered silver (average particle diameter not exceeding 10 μm) | 50% by weight |
| Finely powdered silicon (average particle diameter not exceeding 10 μm) | 20% by weight |
| Epoxy resin (a mixture of 10 parts by weight of phenol novolak epoxy with 8 parts by weight of hexahydrophthalic anhydride) | 20% by weight |
| Ethylene glycol monobutyl ether | 5% by weight |
| Cobalt naphthenate | 5% by weight |

In a mortar, the components described above were thoroughly kneaded to produce a pasty mixture. Through the medium of the elctroconductive paste so produced, a silicon diode having no gold treatment given in advance to the rear surface thereof was die-bonded to a substrate and then wire bonded. The produced diode was tested for diode property. The die-bonding and post cure was carried out at 150° C. for one hour. The diode property was determined by fixing the value of electric current at 10 μA and measuring, at the resultant voltage, the voltage and resistance of the die-bonded part. The results are shown in Table 1.

CONTROLS 1-2

For comparison, a silicon diode having a gold treatment given in advance to the rear surface thereof was die-bonded with the conventional silver paste to a substrate (Control 1) and a silicon diode having no treatment given to the rear surface was die-bonded with the conventional silver paste to a subsrate (Control 2). The resultant products were tested for diode property by following the procedure of Example 1.

The results are shown in Table 1.

TABLE 1

| Sample | Voltage (mV) | Resistance (Ω) |
|---|---|---|
| Example 1 | 2.5 | 250 |
| Control 1 | 5 | 500 |
| Control 2 | 200 | 20,000 |

It is noted from Table 1 that by the use of the electroconductive paste of this invention, a silicon diode possessing more desirable contact resistance than the conventional silicon diode undergone an expensive gold treatment can be mass-produced at a very low cost.

EXAMPLE 2

| | |
|---|---|
| Finely powdered silver (average particle diameter not exceeding 10 μm) | 30% by weight |
| Finely powdered germanium (average particle diameter not exceeding 10 μm) | 40% by weight |
| Epoxy resin (a mixture of 10 parts by weight of phenol novolak epoxy with 8 parts by weight of hexahydrophthalic anhydride) | 20% by weight |
| Ethylene glycol monobutyl ether | 8% by weight |
| $NiH_2$ | 2% by weight |

In a mortar, the components shown above were kneaded thoroughly to produce a pasty mixture. Through the medium of the electroconductive paste so produced, a silicon phototransistor having no gold treatment given in advance was assembled by following the procedure of Example 1. The product was tested for transistor property by following the procedure of Example 1. The results are shown in Table 2. In the test, V cc was fixed at 0.2 V.

CONTROLS 3-4

For comparison, a silicon phototransistor having a gold treatment given in advance to the rear surface thereof was die-bonded with a Au-Si eutectic paste to a substrate (Control 3) and a silicon phototransistor having no gold treatment given in advance was die-bonded with the conventional silver paste (Control 4). The products were tested for the property by following the procedure of Example 2. The results are shown in Table 2.

TABLE 2

| Sample | Amperage (mA) |
|---|---|
| Example 2 | 480 |

TABLE 2-continued

| Sample | Amperage (mA) |
| --- | --- |
| Control 3 | 470 |
| Control 4 | 0 |

It is noted from Table 2 that even in the production of silicon phototransistor, the use of the electroconductive paste of this invention brings about a conspicuous effect of obviating the necessity for the conventional expensive gold treatment. The experiment has demonstrated that the electroconductive paste of this invention is effective in the die-bonding of all silicon elements such as in IC, LSI, super LSI which has heretofore required the rear surface treatment.

EXAMPLE 3

| | |
| --- | --- |
| Finely powdered silver (average particle diameter not exceeding 10 μm) | 30% by weight |
| Finely powdered vanadium (average particle diameter not exceeding 10 μm) | 20% by weight |
| Finely powdered potassium (average particle diameter not exceeding 10 μm) | 20% by weight |
| Epoxy resin of Example 1 | 20% by weight |
| Ethylene glycol monobutyl ether | 8% by weight |
| $CoH_2$ | 2% by weight |

In a mortar, the components shown above were thoroughly blended to produce a pasty mixture. Through the medium of the electroconductive paste so produced, a Ga-Al-As diode having no gold treatment given advance was assembled by following the procedure of Example 1. The product thus obtained was tested for the diode property by following the procedure of Example 1. The results are shown in Table 3.

CONTROLS 5-6

For comparison, a Ga-Al-As diode having a gold treatment given in advance to the rear surface thereof was die bonded with the conventional silver paste (Control 5) and a Ga-Al-As diode having no gold treatment given in advance was die bonded with the conventional silver paste (Control 6). The products were tested for the diode property by following the procedure of Example 1. The results are shown in Table 3.

TABLE 3

| Sample | Voltage (mV) | Resistance (Ω) |
| --- | --- | --- |
| Example 3 | 1.8 | 180 |
| Control 5 | 3 | 300 |
| Control 6 | 1,500 | 150,000 |

It is noted from Table 3 that by the use of the electroconductive paste of the present invention, a diode possessing more desirable contact resistacne then the conventional counter-type undergone the expensive gold treatment can be mass-produced at a very low cost.

EXAMPLE 4

| | |
| --- | --- |
| Finely powdered silver (average particle diameter not exceeding 10 μm) | 50% by weight |
| Finely powdered germanium (average particle diameter not exceeding 10 μm) | 20% by weight |
| Epoxy resin of Example 1 | 20% by weight |
| Ethylene glycol monobutyl ether | 5% by weight |
| $ZrH_4$ | 5% by weight |

In a mortar, the components shown above were thoroughly blended to produce a pasty mixture. Through the medium of the electroconductive paste so produced, a germanium diode having no gold treatment given in advance was assembled by following the procedure of Example 1. The product was tested for the diode property following the procedure of Example 1. The results are shown Table 4. In the test, V cc was fixed at 0.2 V.

CONTROLS 7-8

For comparison, a germanium diode having a gold treatment given to the rear surface thereof was die bonded with a Au-Si eutectic type paste (Control 7) and a germanium diode having no gold treatment given in advance was die bonded with the conventional silver paste (Control 8). The products were tested for the diode property by following the procedure of Example 2. The results are shown in Table 4.

TABLE 4

| Sample | Amperage (mA) |
| --- | --- |
| Example 4 | 1,500 |
| Control 7 | 1,450 |
| control 8 | 0 |

EXAMPLE 5

| | |
| --- | --- |
| Finely powdered silver (average particle diameter not exceeding 10 μm) | 50% by weight |
| Finely powdered CdTe (average particle diameter not exceeding 10 μm) | 20% by weight |
| Epoxy resin of Example 1 | 20% by weight |
| Ethylene glycol monobutyl ether | 5% by weight |
| CrH | 5% by weight |

In a mortar, the components shown above were thoroughly blended to produce a pasty mixture. Through the medium of the electroconductive paste so produced, a Cd-Te diode (N or P) having no gold treatment given in advance was assembled by following the procedure of Example 1. The product was tested for the property by following the procedure of Example 1. The results are shown in Table 5. In this test, V cc was fixed at 0.2 V.

CONTROLS 9-10

For comparison, a Cd-Te diode having a gold treatment given to the rear surface thereof was die bonded with a Au-Si eutectic paste (Control 9) and a Cd-Te diode having no treatment given in advance was die bonded with the conventional silver paste (Control 10). The products thus obtained were tested for the diode property by following the procedure of Example 2. The results are shown in Table 5.

TABLE 5

| Sample | Amperage (mA) |
| --- | --- |
| Example 5 | 1,200 |
| Control 9 | 1,180 |
| Control 10 | 0 |

It is noted from the results given above that in all the elements involved, the electroconductive pastes according to the present invention manifest advantageous effects. They are expected to bring about the same effects in integrated circuits.

What is claimed is:

1. A die bonding electroconductive paste containing at least one element having the same valence as the valence of a semiconductor element to be die-bonded or a compound of said element and a reducing substance selected from the group consisting of metal hydrides, metal carbides, grignard reagents, fatty acids of 12 to 22 carbon atoms, zinc and aluminum lower alkyls of 1–3 carbon atoms, metal salts of naphthenic, acetic and propionic acids, and hydrazine, said paste permitting ohmic contact to be effected between said paste and said semiconductor at a temperature of not less than 100° C.

2. An electroconductive paste according to claim 1, wherein said electroconductive paste comprises 5 to 90% by weight of said element possessing the same valence as the valence of said semiconductor element or a compound of said element (Calulated as the element), 0.5 to 50% by weight of said reducing substance, 0 to 80% by weight of a finely powdered electroconductive substance, 3 to 45% by weight of a binder, and 0 to 30% by weight of a solvent.

3. An electroconductive paste according to claim 2, wherein said semiconductor element is selected from the group consisting of the elements of Group IV, the elements of Groups III and V, and the elements of Groups IIA or IIB and VI.

4. An electroconductive paste according to claim 2, wherein said fine electroconductive powder is at least one metal selected from the group consisting of gold, silver, copper, nickel, rhodium, palladium and silver-palladium.

5. An electroconductive paste according to claim 2, wherein said fine electroconductive powder possesses an average particle diameter of 1 to 20 $\mu$m.

6. An electroconductive paste according to claim 2, wherein said binder is an epoxy resin.

7. An electroconductive paste according to claim 6, wherein said solvent is a glycol ether.

8. An electroconductive paste according to claim 2, wherein said element possessing the same valence as the valence of the semiconductor element or the compound of said element possesses an average particle diameter of 0.5 to 50 $\mu$m.

9. An electroconductive paste according to claim 3, wherein said semiconductor element is an element of Group IV and said element having the same valence as the valence of said semiconductor element is at least one tetravalent element selected from the group consisting of silicon, germanium, carbon, titanium, zirconium, tin, hafnium and lead.

10. An electroconductive paste according to claim 9, wherein said semiconductor element is silicon or germanium and said element having the same valence as the valence of said semiconductor element is at least one tetravalent element selected from the group consisting of silicon, carbon, titanium and zirconium.

11. An electroconductive paste according to claim 3, wherein said semiconductor element is an element of Groups III and V and said element having the same valence as the valence of said semiconductor element is a mixture of at least one trivalent element selected from the group consisting of boron, aluminum, scandium, gallium, yttrium, indium, lanthanides and actinides with at least one pentavalent element selected from the group consisting of nitrogen, phosphoric, vanadium, arsenic, niobium, antimony, tantalum and bismuth.

12. An electroconductive paste according to claim 11, wherein said semiconductor element is selected from the group consisting of potassium-phosphorus, gallium-arsenic, gallium-arsenic-phosphorus, gallium-aluminum-arsenic and gallium-aluminum-arsenic-phosphorus and said element having the same valence as the valence of said semiconductor element is mixture of at least one trivalent element selected from the group consisting of gallium, aluminum, indium and yttrium with at least one pentavalent element selected from the group consisting of arsenic, phosphorus, vanadium, tantalum and niobium.

13. An electroconductive paste according to claim 3, wherein said semiconductor element is an element of Groups IIA or II and VI and said element having the same valence as the valence of said semiconductor element is a mixture of at least one divalent element selected form the group consisting of beryllium, magnesium, zinc, cadmium and mercury with at least one hexavalent element selected from the group consisting of chromium, molybdenum, tungsten, oxygen, sulfur, selenium and tellurium.

14. An electroconductive paste according to claim 13, wherein said semiconductor element is one element selected from the group consisting of zinc-sulfur, zic-selenium, zinc-tellurium, mercury-cadmium-tellurium and said element having the same valence as the valence of said semiconductor element is a mixture of at least one divalent element selected from the group consisting of zinc and cadmium with at least one element selected from the group consisting of selenium and tellurium.

15. An electroconductive paste according to claim 1, wherein said electroconductive paste comprises 20 to 60% by weight of said element having the same valence as the valence of said semiconductor element or said compound of said element, 1 to 10% by weight of said reducing substance, 25 to 60% by weight of said fine electroconductive powder, 10 to 30% by weight of said binder and 3 to 20% by weight of said solvent.

* * * * *